(12) United States Patent
Nakazawa et al.

(10) Patent No.: US 8,387,915 B2
(45) Date of Patent: Mar. 5, 2013

(54) SKID RAIL FOR AIRCRAFTS AND ITS PRODUCTION METHOD

(75) Inventors: Jun Nakazawa, Saitama-ken (JP); Hirohide Azuma, Saitama-ken (JP)

(73) Assignee: Honda Patents & Technologies North America, LLC, Torrance, CA (US)

( * ) Notice: Subject to any disclaimer, the term of this patent is extended or adjusted under 35 U.S.C. 154(b) by 297 days.

(21) Appl. No.: 12/725,973

(22) Filed: Mar. 17, 2010

(65) Prior Publication Data
US 2010/0243798 A1 Sep. 30, 2010

(30) Foreign Application Priority Data
Mar. 27, 2009 (JP) ................. 2009-080607

(51) Int. Cl.
*B64C 25/52* (2006.01)
(52) U.S. Cl. .............. 244/108; 244/121; 244/133
(58) Field of Classification Search ........... 244/105, 244/107, 108, 119, 120, 117 R, 130, 133, 244/121, 129.1, 135 R; D12/2, 3, 4, 324, D12/345
See application file for complete search history.

(56) References Cited

U.S. PATENT DOCUMENTS

| | | | | |
|---|---|---|---|---|
| 1,880,520 A * | 10/1932 | Stout | ........................ | 244/108 |
| 2,010,817 A * | 8/1935 | Henry | ........................ | 244/107 |
| 2,711,868 A * | 6/1955 | Parker et al. | ................ | 244/107 |
| 2,779,558 A * | 1/1957 | Hereil et al. | ................ | 244/108 |
| 2,980,368 A * | 4/1961 | Jakimiuk et al. | .......... | 244/102 R |
| 3,387,802 A * | 6/1968 | Cruz | ........................ | 244/108 |
| 4,000,871 A * | 1/1977 | DeHaai | ..................... | 244/108 |
| 5,126,190 A * | 6/1992 | Sakatani et al. | ............. | 244/131 |
| 6,478,253 B1 * | 11/2002 | Seidel | ........................ | 244/119 |
| 2002/0153454 A1 * | 10/2002 | Seidel | ..................... | 244/119 |
| 2010/0133380 A1 * | 6/2010 | Roebroeks et al. | ......... | 244/119 |
| 2011/0210201 A1 * | 9/2011 | Fews et al. | ................... | 244/108 |

FOREIGN PATENT DOCUMENTS
JP 2000-344196 A 12/2000

* cited by examiner

*Primary Examiner* — Michael Carone
*Assistant Examiner* — Steven Hawk
(74) *Attorney, Agent, or Firm* — Birch, Stewart, Kolasch & Birch, LLP (57) ABSTRACT

A skid rail for aircrafts comprising (i) a base member comprising a long board fixed to a bottom surface of an aircraft fuselage, and bosses integrally projecting from an outer surface of the long board with longitudinal intervals, (ii) cores bonded to the long board between the bosses to form a rail-shaped, integral structure, and (iii) a skin covering the bosses and the cores, the base member and the skin being formed by a first fiber-reinforced plastic having fabrics of glass fibers and/or carbon fibers, and the cores being formed by a second fiber-reinforced plastic having fabrics of fibers having higher wear resistance than that of fibers in the first fiber-reinforced plastic.

17 Claims, 9 Drawing Sheets

SKID RAIL FOR AIRCRAFTS AND ITS PRODUCTION METHOD

FIELD OF THE INVENTION

The present invention relates to a skid rail for aircrafts having excellent wear resistance and machinability, and its production method.

BACKGROUND OF THE INVENTION

An aircraft has a skid rail and a tail skid on a bottom surface of a fuselage as parts for protecting the aircraft fuselage from damage when the aircraft comes into contact with a runway, etc. If the skid rail were totally worn by belly-landing, a carry-through tank would not be sufficiently protected, necessitating the skid rail to have sufficient wear resistance. The skid rail and the tail skid are conventionally formed by glass-fiber-reinforced plastics. For instance, JP 2000-344196 A proposes a retractable, wear-resistant tail skid for aircrafts, which has a roller pad formed by a glass-fiber-reinforced plastic at its tip end. However, the glass fiber-reinforced plastic does not have sufficient wear resistance.

Because the glass fiber-reinforced plastics have insufficient wear resistance, it would be conceivable to form the entire skid rail by, for instance, plastics reinforced by high-wear-resistant fibers such as poly(p-phenylenebenzobisoxazole) fibers. However, because such high-wear-resistant fiber-reinforced plastics have low machinability, it is extremely difficult to provide skid rails formed thereby with recesses or holes for fasteners.

OBJECT OF THE INVENTION

Accordingly, an object of the present invention is to provide a skid rail for aircrafts having excellent wear resistance and machinability, and its production method.

DISCLOSURE OF THE INVENTION

As a result of intense research in view of the above object, the inventors have found that a skid rail for aircrafts having both high wear resistance and high machinability can be obtained by (a) constituting the skid rail with a base member constituted by a long board integrally comprising pluralities of bosses with longitudinal intervals, pluralities of cores bonded to the long board between the bosses, and a skin covering the bosses and the cores, (b) forming the long board and the skin by a first fiber-reinforced plastic having excellent machinability, which comprises fabrics of glass fibers and/or carbon fibers, and forming the cores by a second fiber-reinforced plastic having higher wear resistance than that of the first fiber-reinforced plastic. The present invention has been completed based on such finding.

Thus, the skid rail of the present invention fixed to a bottom surface of an aircraft fuselage comprises (i) a base member comprising a long board fixed to a bottom surface of the aircraft fuselage, and pluralities of bosses integrally projecting from an outer surface of the long board with longitudinal intervals, (ii) pluralities of cores bonded to the long board between the bosses to form a rail-shaped, integral structure, and (iii) a skin covering the bosses and the cores, the base member and the skin being formed by a first fiber-reinforced plastic having fabrics of glass fibers and/or carbon fibers, and the cores being formed by a second fiber-reinforced plastic having fabrics of fibers having higher wear resistance than that of fibers in the first fiber-reinforced plastic.

Each core is preferably formed by curing a prepreg laminate of the second fiber-reinforced plastic, and disposed such that the fabrics in the second fiber-reinforced plastic are oriented substantially perpendicularly to the long board. This structure provides excellent wear resistance.

It is preferable that the first fiber-reinforced plastic comprises a glass fiber fabric and a matrix resin, and the second fiber-reinforced plastic comprises fabrics of fibers having higher wear resistance than that of glass fibers and a matrix resin.

Preferable is any one of (1) a combination in which both said base member and said skin are formed by a first fiber-reinforced plastic comprising glass fiber fabrics, (2) a combination in which said base member is formed by a first fiber-reinforced plastic comprising glass fiber fabrics, and said skin is formed by a first fiber-reinforced plastic comprising carbon fiber fabrics, and (3) a combination in which both said base member and the said skin are formed by a first fiber-reinforced plastic comprising carbon fiber fabrics.

It is preferable that said base member is formed by a first fiber-reinforced plastic comprising glass fiber fabrics, and said skin is formed by a first fiber-reinforced plastic comprising carbon fiber fabrics, and said cores is formed by second fiber-reinforced plastic.

The wear-resistant fibers are preferably at least one selected from the group consisting of poly(p-phenylenebenzobisoxazole) fibers, aromatic polyamide fibers, aromatic polyimide fibers and aromatic polyester fibers.

The bosses are preferably provided with recesses each for receiving a fastener. The cores are preferably bonded to the bosses with no gap.

The method for producing the above skid rail for aircrafts comprises the steps of (1) cutting a block of a cured prepreg laminate of the first fiber-reinforced plastic to form the base member, (2) curing a prepreg laminate of the second fiber-reinforced plastic to form the cores, (3) bonding the cores to the base member to form the rail-shaped integral structure, (4) covering the bosses and the cores with a prepreg of the first fiber-reinforced plastic, and (5) curing the prepreg to form the skin.

In the step (3), the cores are preferably disposed on the base member, such that the fabrics in the second fiber-reinforced plastic are oriented substantially perpendicularly to the long board. After the step (5), the bosses are preferably provided with recesses each receiving a fastener. After the step (5), a surface of the skin may be smoothed.

BRIEF DESCRIPTION OF THE DRAWINGS

FIG. 11(*a*) is a cross-sectional view showing the step of forming a fastener-receiving recess in another boss.

FIG. 11(*b*) is a cross-sectional view showing a base member provided with holes for fixing with fasteners.

DESCRIPTION OF THE PREFERRED EMBODIMENTS

[1] Skid Rail

Figure 1A:
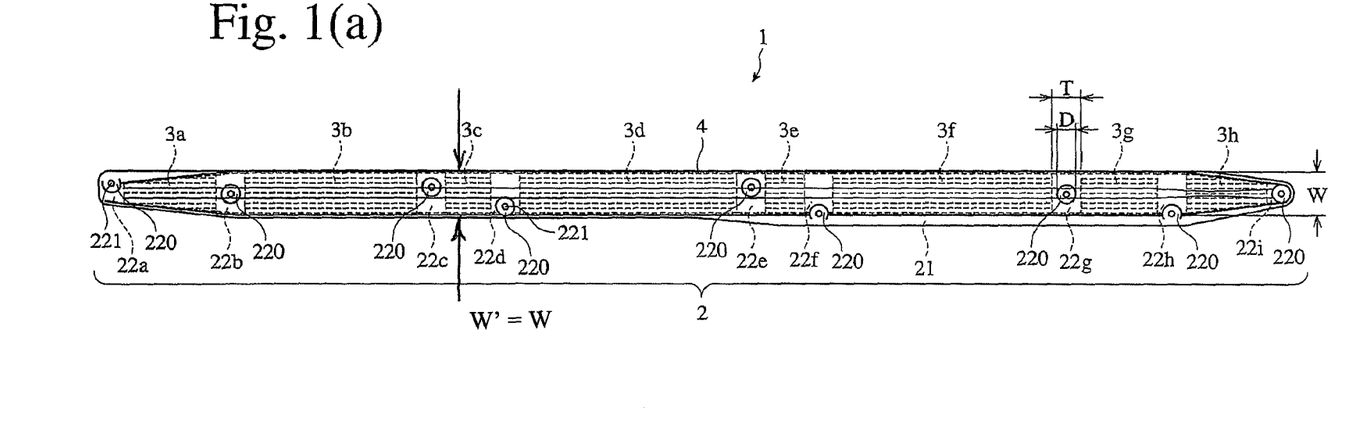
FIG. 1(a) is a plan view showing an example of the skid rails of the present invention.
Figure 1B:
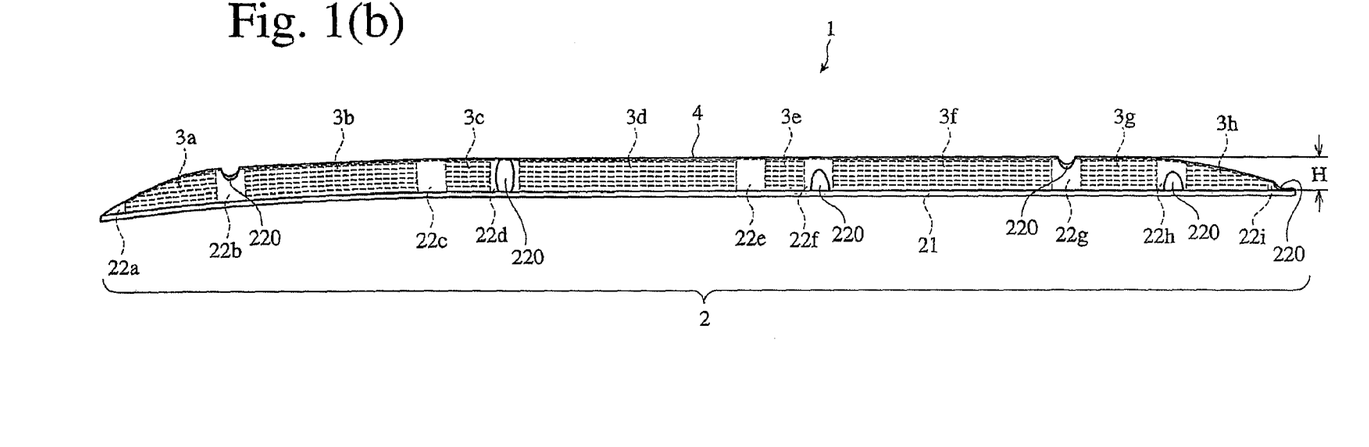
FIG. 1(b) is a longitudinal side view showing an example of the skid rails of the present invention.
Figure 2A:
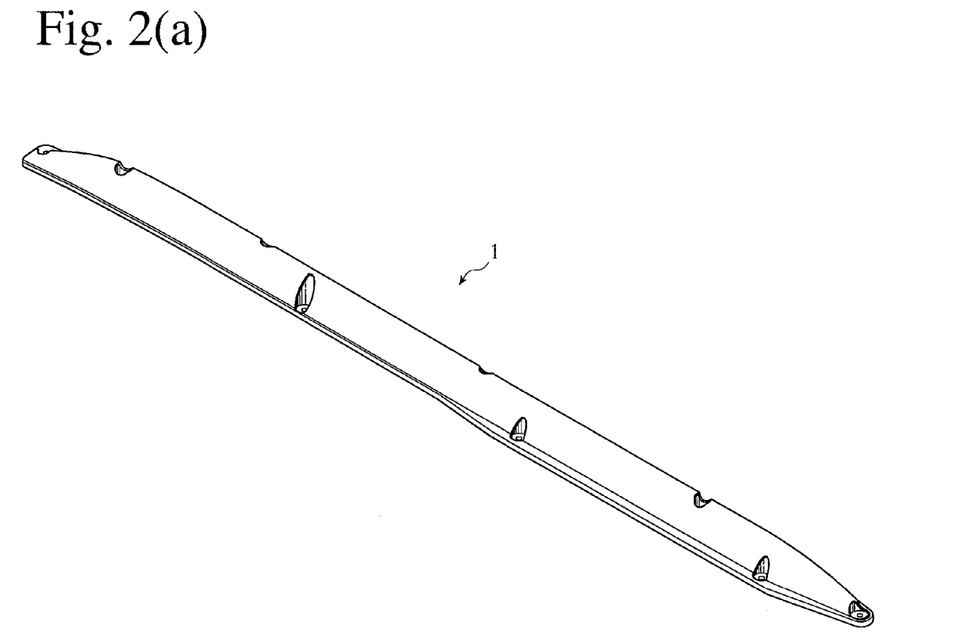
FIG. 2(a) is a perspective view showing the skid rail of the present invention.
Figures 2B, 2C:
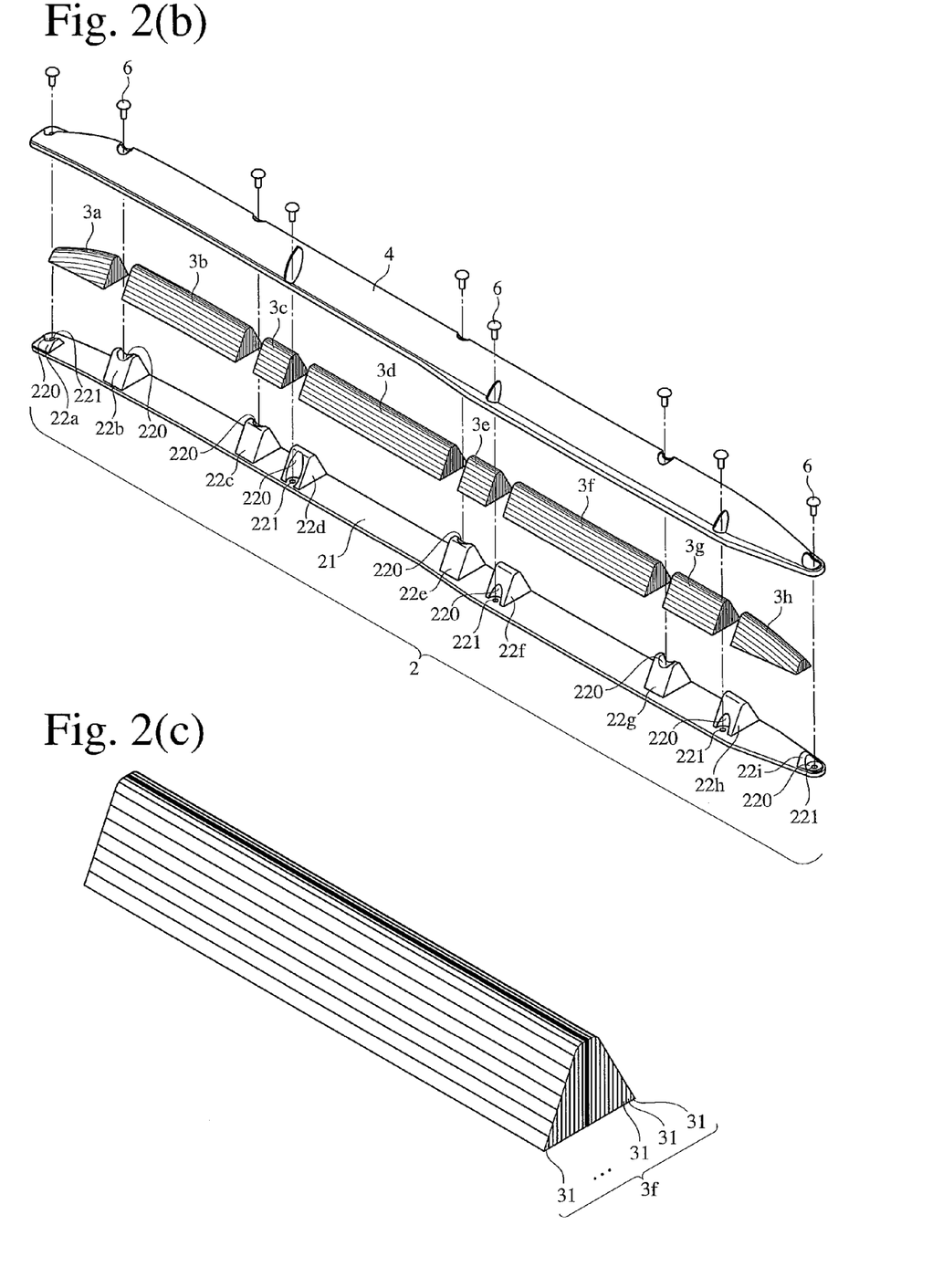
FIG. 2(b) is an exploded perspective view showing the internal structure of the skid rail of the present invention.
FIG. 2(c) is a partially enlarged perspective view showing a core in FIG. 2(a).

FIGS. 1 and 2 show an example of the skid rails of the present invention for aircrafts. This skid rail 1 comprises (i) a base member 2 comprising a long board 21 fixed to a bottom surface of an aircraft fuselage, and pluralities of bosses 22*a*-22*i* integrally projecting from an outer surface of the long board 21 with longitudinal intervals and having recesses 220 for receiving fasteners (rivets, bolts, etc.) 6, (ii) pluralities of cores 3*a*-3*h* bonded to the long board 21 between the bosses 22*a*-22*i* to form a rail-shaped, integral structure, and (iii) a skin 4 covering the bosses 22*a*-22*i* and the cores 3*a*-3*h*. The base member 2 and the skin 4 are formed by a first fiber-reinforced plastic comprising fabrics of glass fibers and/or carbon fibers, and the cores 3*a*-3*h* are formed by a second fiber-reinforced plastic comprising fabrics having fabrics of fibers having higher wear resistance (referred to simply as "wear-resistant fibers") than that of fibers in the first fiber-reinforced plastic.

(1) Materials (a) First Fiber-Reinforced Plastic

The first fiber-reinforced plastic comprises fabrics of glass fibers and/or carbon fibers and a matrix resin. Although the fabrics may be woven fabrics, nonwoven fabrics or knitted fabrics, they are preferably woven fabrics from the aspect of strength. The matrix resin may be a thermosetting or thermoplastic resin. The thermosetting resins include epoxy resins, polyurethanes, unsaturated polyesters, bismaleimide resins, phenol resins, etc. The thermoplastic resins include polyamides, polyimides, polyesters, polyacetal, polyarylene sulfide, polyetheretherketone, polyetherketone, etc.

From the aspect of machinability, the first fiber-reinforced plastic preferably comprises glass fibers. More preferable from the aspect of machinability, mechanical strength and heat resistance are a combination of glass fibers with epoxy resins and a combination of glass fibers with polyetheretherketone. A ratio of the above fibers to the matrix resin may be properly determined.

(b) Second Fiber-Reinforced Plastic

The second fiber-reinforced plastic comprises fabrics of fibers having higher wear resistance than that of fibers in the first fiber-reinforced plastic, and the matrix resin. The fibers having particularly high wear resistance (hereinafter referred to simply as "wear-resistant fibers") are preferably at least one selected from the group consisting of poly(p-phenylenebenzobisoxazole) fibers, aromatic polyamide fibers, aromatic polyimide fibers and aromatic polyester fibers, more preferably poly(p-phenylenebenzobisoxazole) fibers, which are commercially available as Zylon (registered trademark) from TOYOBO Co., Ltd. To have good wear resistance, the filling density of the wear-resistant fibers is preferably 1.5 g or more per 1 cm$^3$ of the second fiber-reinforced plastic. Although the fabrics having wear-resistant fibers may be woven fabrics, nonwoven fabrics or knitted fabrics, they are preferably woven fabrics from the aspect of strength. The matrix resins are preferably thermosetting resins, more preferably epoxy resins. The second fiber-reinforced plastic may contain fabrics of glass fibers and/or carbon fibers in a range not deteriorating wear resistance.

(c) Combination of First and Second Fiber-Reinforced Plastics

A combination of the first and second fiber-reinforced plastics should meet the condition that fibers in the second fiber-reinforced plastic have higher wear resistance than that of fibers in the first fiber-reinforced plastic. Examples meeting this condition include (1) a combination in which the first fiber-reinforced plastic comprises glass fibers and a matrix resin, and the second fiber-reinforced plastic comprises carbon fibers or fibers having higher wear resistance than that of carbon fibers (fibers of poly(p-phenylenebenzobisoxazole), aromatic polyamides, aromatic polyimides or aromatic polyesters) and a matrix resin, and (2) a combination in which the first fiber-reinforced plastic comprises carbon fibers and a matrix resin, and the second fiber-reinforced plastic comprises fibers of poly(p-phenylenebenzobisoxazole), aromatic polyamides, aromatic polyimides or aromatic polyesters and a matrix resin, though not restrictive of course. In any case, the matrix resins in the first and second fiber-reinforced plastic are preferably thermosetting resins.

The base member 2 and the skin 4 need not be formed by the same first fiber-reinforced plastic. Specific examples include (1) a combination in which both the base member 2 and the skin 4 are formed by a first fiber-reinforced plastic comprising glass fiber fabrics, (2) a combination in which the base member 2 is formed by a first fiber-reinforced plastic comprising glass fiber fabrics, and the skin 4 is formed by a first fiber-reinforced plastic comprising carbon fiber fabrics, and (3) a combination in which both the base member 2 and the skin 4 are formed by a first fiber-reinforced plastic comprising carbon fiber fabrics. When the base member 2 is formed by a first fiber-reinforced plastic comprising glass fiber fabrics, the cores 3*a*-3*h* are preferably formed by a second fiber-reinforced plastic comprising carbon fiber fabrics or wear-resistant fiber fabrics. When the base member 2 is formed by a first fiber-reinforced plastic comprising carbon fiber fabrics, the cores 3*a*-3*h* are preferably formed by a second fiber-reinforced plastic comprising wear-resistant fiber fabrics. Particularly to meet both requirements of wear resistance and workability, it is preferable that the base member 2 is formed by a first fiber-reinforced plastic comprising glass fiber fabrics, which can be easily worked, that the skin 4 is formed by a first fiber-reinforced plastic comprising carbon fiber fabrics, which has excellent strength, and that the cores 3*a*-3*h* are formed by a second fiber-reinforced plastic comprising wear-resistant fiber fabrics.

(2) Shape

As shown in FIGS. 1 and 2, the bosses 22*a*-22*i* and the cores 3*a*-3*h* have trapezoidal cross sections with those on both ends smaller, such that the skid rail 1 has a streamlined shape with small air resistance as a whole. The cores 3*a*-3*h* and the bosses 22*a*-22*i* have the same outer shapes and sizes to avoid any steps between them. The cores 3a-3h should be bonded to the long board 21 and the bosses 22a-22i without gap. For this purpose, these parts have smooth surfaces.

The cross section shapes and sizes of the cores 3a-3h are determined in a range in which an aircraft keeps good aerodynamic characteristics, such that a carry-through tank in the fuselage can be protected, and that a time period during which the skid rail 1 can withstand wear in the case of belly-landing is longer than a sliding time (for instance, about 17 seconds when the aircraft has a weight of about 4.2 tons, and the landing speed is about 200 km/h). For instance, when a small aircraft of about 4.2 tons has two parallel skid rails 1, 1 each having a trapezoidal cross section as shown in FIGS. 1(a), 1(b), 2(a), 2(b) and 2(c), the cores 3a-3h may have a total length of about 1-2 m, a bottom width W of about 3-5 cm, and a height H of about 2.5-5 cm. As can be seen in FIG. 1(a), the long board 21 has width W' which varies along the length thereof, and at least one of the plurality of cores 3b, 3c has a width W and is fixed to a position along the length of the long board 21 where the width W is equal to the width W' of the long board 21.

The fabrics constituting the cores 3a-3h are oriented substantially perpendicularly to the long board 21. FIG. 2(c) illustrates a core 3f formed by cured prepregs 31 having excellent wear resistance.

FIG. 1 shows a skid rail 1 having nine bosses, though the number and position of the bosses may properly be changed depending on the number and positions of the fasteners 6. The positions of the fastener-receiving recesses 220 in the bosses 22a-22i may also be determined properly depending on the positions of the fasteners 6. The length T of each boss 22a-22i in the longitudinal direction of the skid rail 1 may properly be determined depending on the diameter D of the recess 220. Because the base member 2 is formed by a relatively-easy-to-work first fiber-reinforced plastic, the bosses 22a-22i can easily be provided with the fastener-receiving recesses 220.

Because the cores 3a-3h are disposed and bonded between the bosses 22a-22i, the cores 3a-3h do not peel off from the base member 2 under strong friction between the skid rail 1 and a runway during belly-landing. An end portion of the long board 21 may be curved along an outer surface of the fuselage to which the skid rail 1 is fixed. The long board 21 has a sufficient area to prevent the bosses 22a-22i and the cores 3a-3h from detaching by belly-landing.

Because the skin 4 is formed by the first fiber-reinforced plastic, which is relatively easy to work, it can be smoothed easily by cutting, grinding, etc. The skin 4 may be as thick as about 0.5-3 mm.

[2] Production Method of Skid Rail (1) Formation of Base Member

Figure 3:
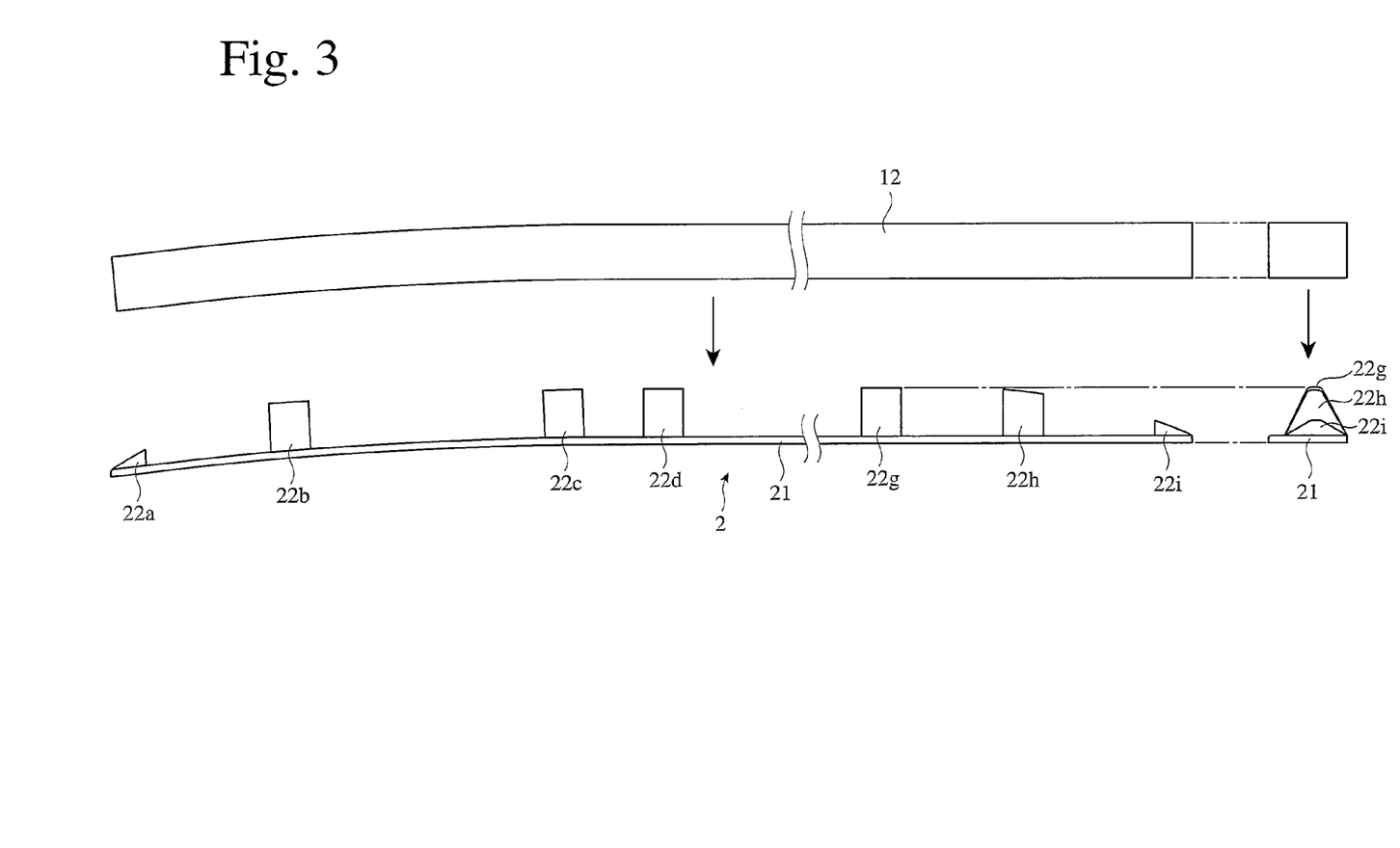
FIG. 3 is a view showing the relation between a block of the first fiber-reinforced plastic and the base member obtained therefrom from longitudinal and transverse sides.

As shown in FIG. 3, prepregs of the first fiber-reinforced plastic are laminated and cured to a block 12, which is cut to a shape corresponding to the base member 2 having the long board 21 and the bosses 22a-22i.

(2) Formation of Cores

Figure 4A:
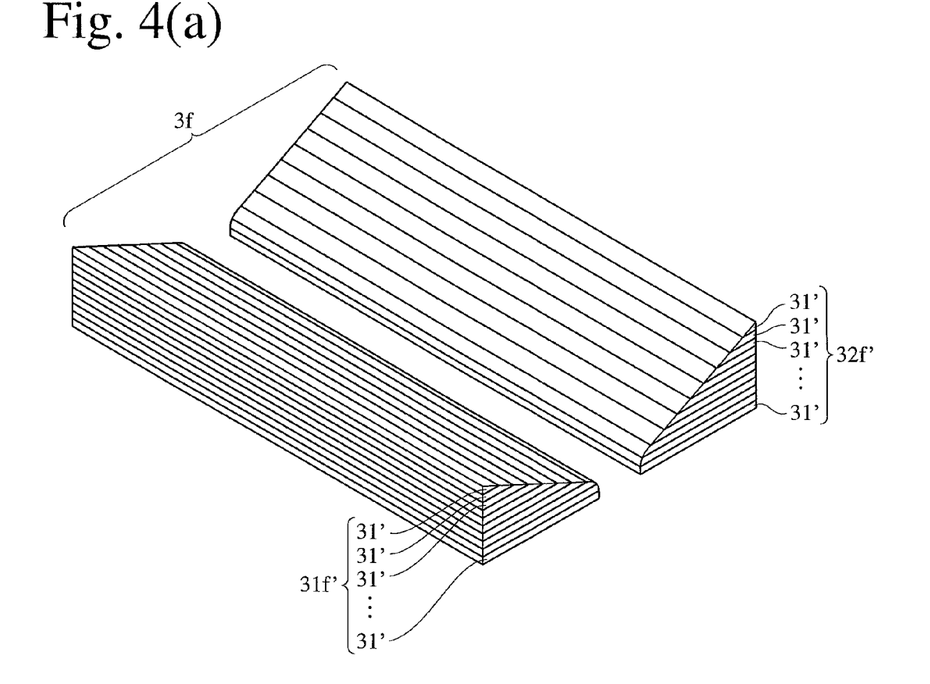
FIG. 4(a) is a perspective view showing two uncured prepreg laminates for forming a core.
Figure 4B:
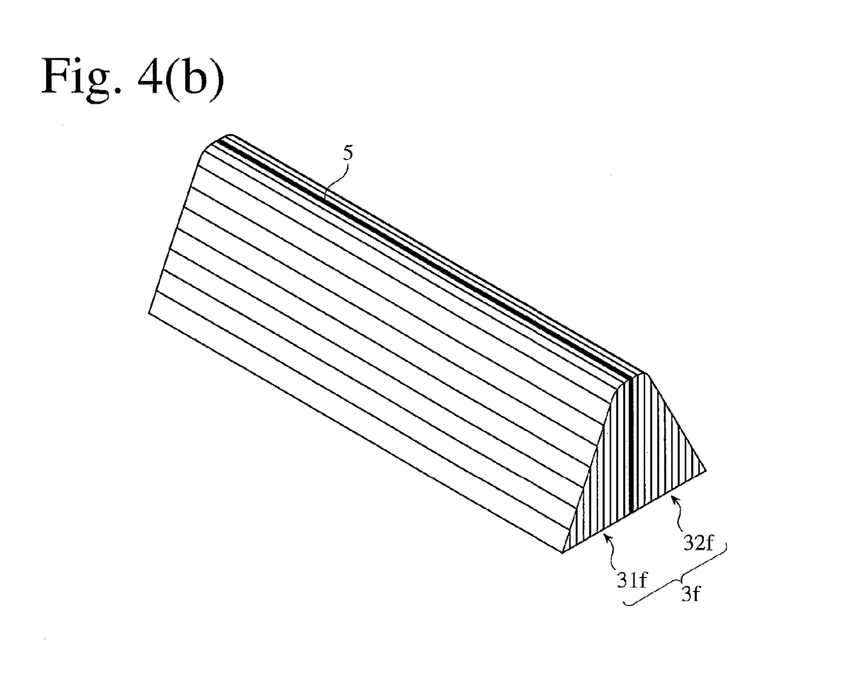
FIG. 4(b) is a perspective view showing a core formed by bonding two cured prepreg laminates.

Using a core 3f as an example, the formation of the cores 3a-3h will be explained. As shown in FIG. 4(a), uncured prepreg laminates 31f' and 32f' each having a substantially triangular shape corresponding to those obtained by halving the core 3f along the orienting direction of fabrics are preferably formed, cured and then bonded to provide the core 3f. Each uncured prepreg laminate 31f', 32f' is formed by laminating a large number of rectangular prepregs 31' of the second fiber-reinforced plastic with gradually changing widths in a molding die. After curing, the prepreg laminates 31f', 32f' are bonded to each other with an adhesive 5 to form a trapezoidal core 3f as shown in FIG. 4(b). Such method can easily form the cores 3a-3h from the second fiber-reinforced plastic with low machinability.

(3) Bonding of Base Member and Cores

Figure 5:
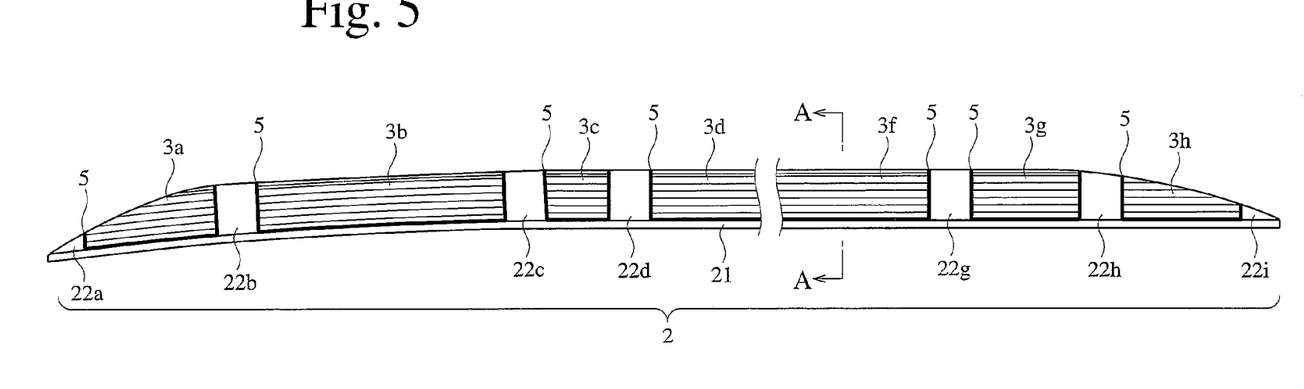
FIG. 5 is a longitudinal side view showing a base member to which cores are bonded.
Figure 6:
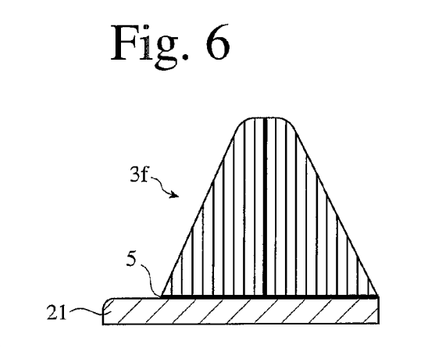
FIG. 6 is a cross-sectional view taken along the line A-A in FIG. 5.

As shown in FIGS. 5 and 6, the cores 3a-3h disposed between the bosses 22a-22i are bonded to the base member 2 with an adhesive 5.

(4) Formation of Skin

Figure 7:
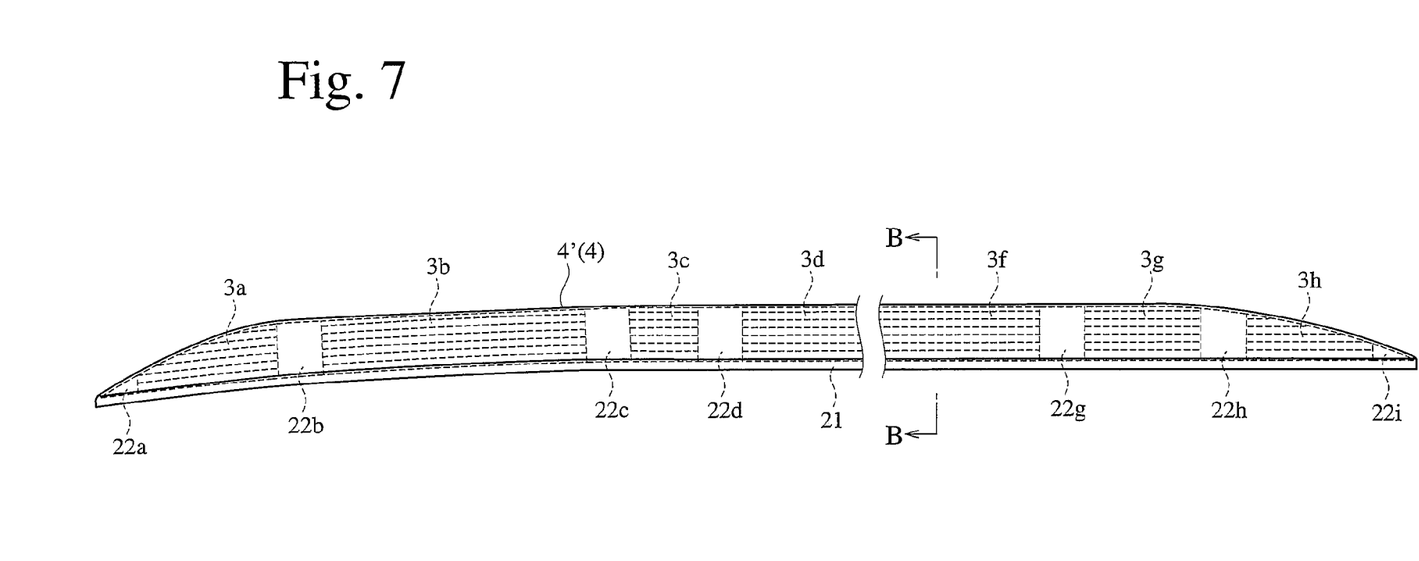
FIG. 7 is a longitudinal side view showing the relation between cores, bosses and a skin in the skid rail of the present invention.
Figure 8:
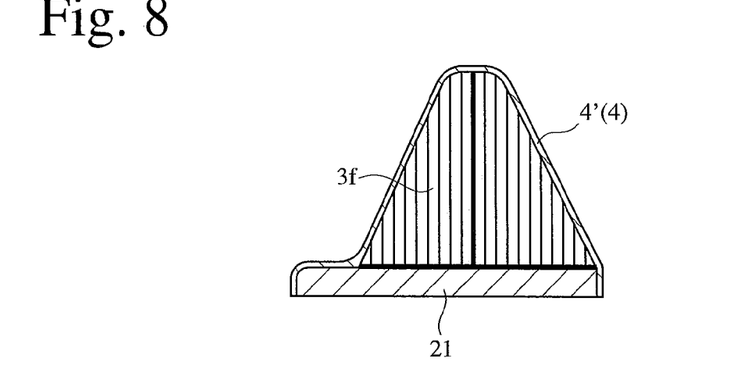
FIG. 8 is a cross-sectional view taken along the line B-B in FIG. 7.

As shown in FIGS. 7 and 8, the cores 3a-3h and the base member 2 (long board 21 and bosses 22a-22i) are covered with an uncured prepreg 4' of the first fiber-reinforced plastic, and cured to form a skin 4.

(5) Surface Smoothing

Figure 9:
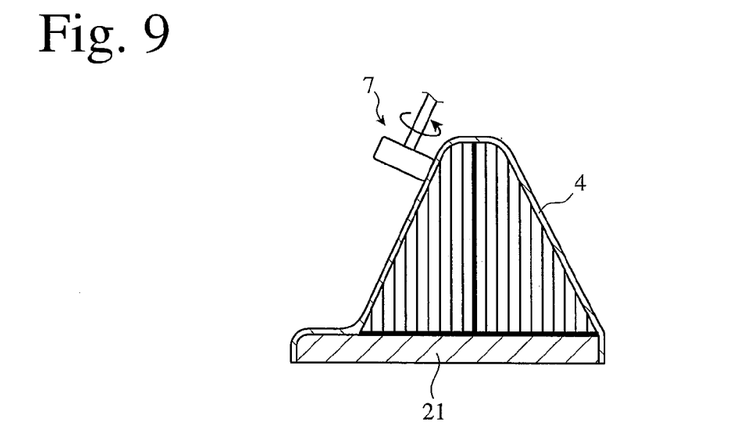
FIG. 9 is a cross-sectional view showing the step of smoothing a skin surface.

To reduce air resistance, as shown in FIG. 9, the outer surface of the skin 4 may be smoothed with a grinder 7, etc. Before forming the skin 4, the cores 3a-3h and exposed portions of the base member 2 may be covered with the same resin as the matrix resin to have smooth surfaces. The skin 4 formed after resin coating and surface smoothing may be further surface-smoothed.

(6) Formation of Fastener-Receiving Recesses

Figure 10:
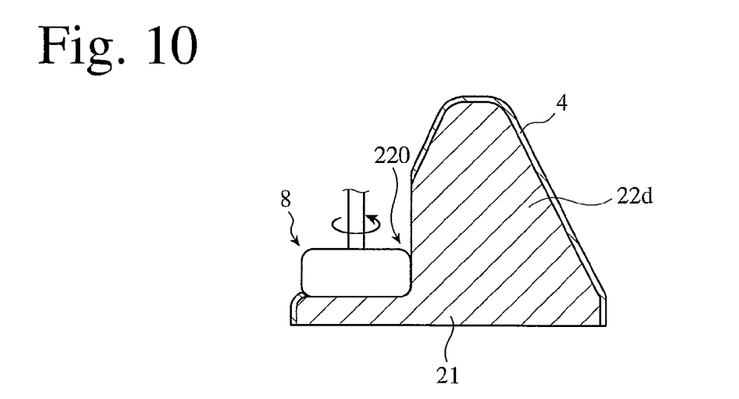
FIG. 10 is a cross-sectional view showing the step of forming a fastener-receiving recess in one of the bosses.
Figures 11A, 11B:
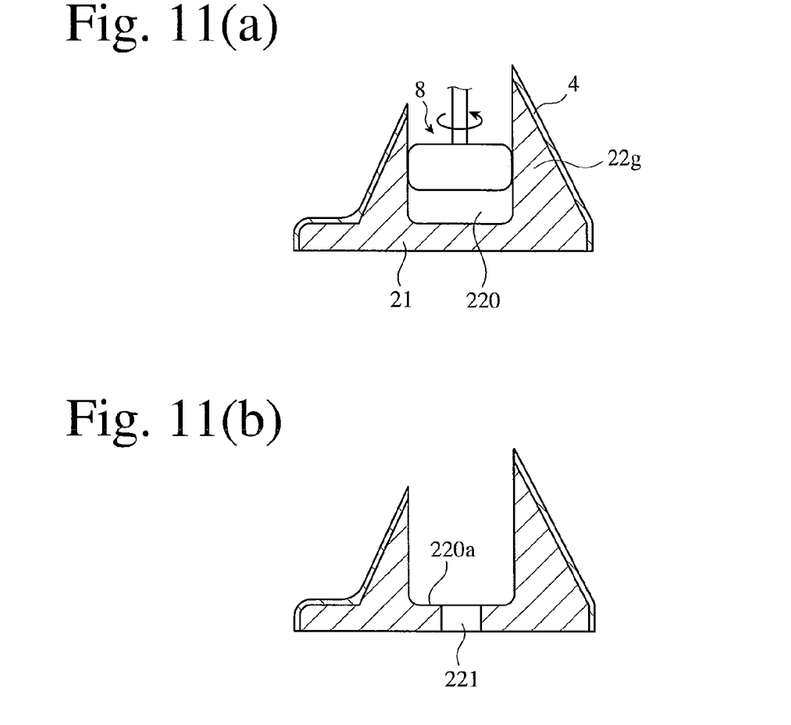

The bosses 22a-22i are provided with fastener-receiving recesses 220. As shown in FIGS. 10 and 11(a) as an example, a recess 220 is formed in each boss 22a-22i with a cutting means 8 such as an end mill.

(7) Formation of Fixing Holes

As shown in FIG. 11(b), a flat bottom portion (seat portion) 220a of each recess 220 is bored by a drill, etc. to form a fixing hole 221 to the long board 21 of the base member 2.

[3] Aircrafts

Figure 12:
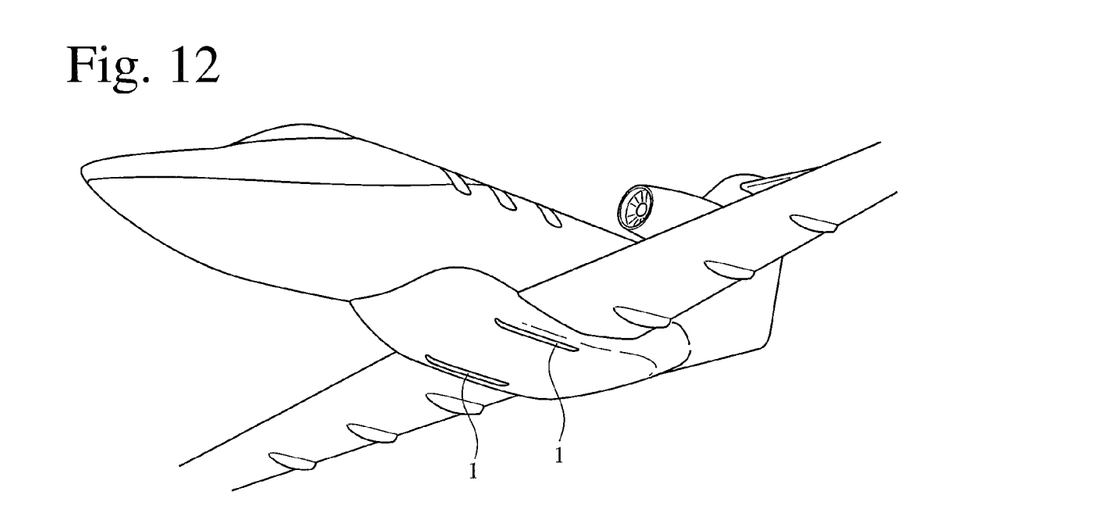
FIG. 12 is a perspective view showing an example of aircrafts equipped with the skid rail of the present invention.

FIG. 12 shows an example of aircrafts provided with a pair of parallel skid rails 1, 1 of the present invention fixed to a bottom surface of the fuselage. The skid rail of the present invention having excellent wear resistance is suitable for a small aircraft having a carry-through tank inside the bottom of a fuselage. Although the depicted example has two skid rails, the number of skid rails is not restrictive.

Although the present invention has been explained in detail above referring to the drawings, it is not restricted thereto, but various modifications may be added unless they deviate from the scope of the present invention.

EFFECT OF THE INVENTION

Because the skid rail of the present invention for aircrafts comprises a base member constituted by a long board having pluralities of bosses, pluralities of cores bonded to the long board between the bosses, and a skin covering them, the long board and the skin being formed by the first fiber-reinforced plastic having excellent machinability, and the cores being formed by the second fiber-reinforced plastic having excellent wear resistance, it has sufficient wear resistance and machinability. Accordingly, although the skin wears off during belly-landing, etc., the cores do not wear off until the aircraft stops, thereby fully preventing a bottom surface of a fuselage from coming into direct contact with the runway, etc. In addition, it can be easily worked to form holes through which the skid rail is fixed to the aircraft fuselage. Such skid rail is suitable for a small aircraft having a carry-through tank in the belly of the fuselage.

What is claimed is:

1. A skid rail fixed to a bottom surface of an aircraft fuselage comprising (i) a base member comprising a long board fixed in a longitudinal direction to a bottom surface of said aircraft fuselage, and pluralities of bosses integrally projecting from an outer surface of said long board with longitudinal intervals, (ii) pluralities of cores bonded to said long board between said bosses to form a rail-shaped, integral structure, and (iii) a skin covering said bosses and said cores, said base member and said skin being formed by a first fiber-reinforced plastic having fabrics of glass fibers and/or carbon fibers, and said cores being formed by a second fiber-reinforced plastic having fabrics of fibers having higher wear resistance than that of fibers in said first fiber-reinforced plastic, wherein the long board has width W' which varies along the length thereof, and at least one of the plurality of cores has a width W and is fixed to a position along the length of the long board where the width W is equal to the width W' of the long board.

2. The skid rail for aircrafts according to claim 1, wherein each of the plurality of cores is formed by curing a prepreg laminate of said second fiber-reinforced plastic, and disposed such that the fabrics in said second fiber-reinforced plastic are oriented substantially perpendicularly to said long board, wherein the at least one of the plurality of cores has a trapezoidal-shaped cross section having the width W and a height H.

3. The skid rail for aircrafts according to claim 1, wherein said first fiber-reinforced plastic comprises a glass fiber fabric and a matrix resin, and said second fiber-reinforced plastic comprises the fabrics of fibers having higher wear resistance than that of the glass fibers and a matrix resin.

4. The skid rail for aircrafts according to claim 1, which comprises any one of (1) a combination in which both said base member and said skin are formed by said first fiber-reinforced plastic comprising the fabrics of glass fiber, (2) a combination in which said base member is formed by said first fiber-reinforced plastic comprising the fabrics of glass fiber-f, and said skin is formed by said first fiber-reinforced plastic comprising the fabrics of carbon fiber, and (3) a combination in which both said base member and said skin are formed by said first fiber-reinforced plastic comprising the fabrics of carbon fiber.

5. The skid rail for aircrafts according to claim 4, wherein said base member is formed by said first fiber-reinforced plastic comprising the fabrics of glass fiber, wherein said skin is formed by the first fiber-reinforced plastic comprising the fabrics of carbon fiber, and wherein said cores are formed by the second fiber-reinforced plastic comprising the fabrics of wear-resistant fiber.

6. The skid rail for aircrafts according to claim 1, wherein said wear-resistant fibers are at least one selected from the group consisting of poly(p-phenylenebenzobisoxazole) fibers, aromatic polyamide fibers, aromatic polyimide fibers and aromatic polyester fibers.

7. The skid rail for aircrafts according to claim 1, wherein said bosses are provided with recesses each for receiving a fastener.

8. The skid rail for aircrafts according to claim 1, wherein said cores are bonded to said bosses with no gap.

9. The skid rail for aircrafts according to claim 1, wherein the at least one of the plurality of cores has a length that is different from lengths of others of the plurality of cores.

10. The skid rail for aircrafts according to claim 1, wherein each of the plurality of cores has a trapezoidal-shaped cross section.

11. The skid rail for aircrafts according to claim 1, wherein one of the bosses is provided between each of the cores along a length of the long board, and each of the bosses is provided with a recess for receiving a fastener, wherein some of recesses are arranged closer to a lateral edge of the long board than others of the recesses.

12. The skid rail for aircrafts according to claim 1, wherein the base member is substantially flat in a lateral direction along an entire length thereof.

13. The skid rail for aircrafts according to claim 10, wherein each of the plurality of cores includes two prepreg laminates, each of the two prepreg laminates having a cross section in a shape of a right triangle, so that when the two prepregs are fixed together, each of the cores has a trapezoidal-shaped cross section.

14. A method for producing the skid rail for aircrafts recited in claim 1, comprising the steps of (1) cutting a block of a cured prepreg laminate of said first fiber-reinforced plastic to form said base member, (2) curing a prepreg laminate of said second fiber-reinforced plastic to form said cores, (3) bonding said cores to said base member to form said rail-shaped integral structure, (4) covering said bosses and said cores with a prepreg of said first fiber-reinforced plastic, and (5) curing said prepreg of said first fiber-reinforced plastic to form said skin.

15. The method for producing a skid rail for aircrafts according to claim 14, wherein said cores are disposed on said base member in said step (3), such that the fabrics in said second fiber-reinforced plastic are oriented substantially perpendicularly to said long board.

16. The method for producing a skid rail for aircrafts according to claim 14, wherein after said step (5), said bosses are provided with recesses each receiving a fastener.

17. The method for producing a skid rail for aircrafts according to claim 14, wherein after said step (5), a surface of said skin is smoothed.

* * * * *